United States Patent [19]

Jacobson et al.

[11] Patent Number: 5,183,788

[45] Date of Patent: Feb. 2, 1993

[54] MODULAR SURFACE CATALYZED MEMBRANE CONTAINING A MICROPOROUS MEMBRANE CATALYST LAYER AND TRANSPORT LAYER

[75] Inventors: Allan J. Jacobson, Houston, Tex.; Wen-Yih F. Lai, Fair Lawn, N.J.; Michael G. Matturro, Lambertville, N.J.; Harry W. Deckman, Clinton, N.J.; James A. McHenry, Washington, N.J.; Robert P. Reynolds, Clinton, N.J.; Qiyao Zhang, Belvidere, N.J.

[73] Assignee: Exxon Research and Engineering Company, Florham Park, N.J.

[21] Appl. No.: 775,646

[22] Filed: Oct. 10, 1991

[51] Int. Cl.$^5$ .............................................. B01J 35/04
[52] U.S. Cl. ...................................................... 502/4
[58] Field of Search ............... 502/527, 439, 313, 220, 502/221, 222, 223, 246, 247, 250, 254, 255, 259, 261, 262, 308, 309, 315, 321, 322, 323, 327, 328, 332, 333, 334, 335, 337, 339, 350, 353, 354, 355, 4

[56] References Cited

U.S. PATENT DOCUMENTS

| | | | |
|---|---|---|---|
| 3,876,555 | 4/1975 | Gryaznov et al. | 502/527 X |
| 4,631,263 | 12/1986 | Mizumoto et al. | 502/527 X |
| 4,696,910 | 9/1987 | Gustafsson et al. | 502/527 X |
| 4,865,630 | 9/1989 | Abe | 55/158 |
| 4,921,823 | 5/1990 | Furneaux et al. | 502/439 X |
| 5,051,391 | 9/1991 | Tomisawa et al. | 502/527 X |

*Primary Examiner*—W. J. Shine
*Assistant Examiner*—Douglas J. McGinty
*Attorney, Agent, or Firm*—Joseph J. Dvorak

[57] ABSTRACT

Accordingly, there is provided a catalytic membrane comprising a porous substrate having a first surface and a second surface. The substrate has micropores, for example, pores ranging from about 10 Å to about 2000 Å in diameter, at least in a region extending from the first surface toward the second surface for a preselected distance. Preferably, the preselected distance will be sufficient to provide a measurable resistance to the flow of a fluid, such as a gas, through the micropores. A catalyst is deposited at least on the first surface of the substrate, although optionally, the catalyst is deposited on the substrate in the micorpore region. A transport layer is provided on the first surface of the substrate, including any catalyst on the first surface.

10 Claims, 3 Drawing Sheets

MODULAR SURFACE CATALYZED MEMBRANE CONTAINING A MICROPOROUS MEMBRANE CATALYST LAYER AND TRANSPORT LAYER

FIELD OF THE INVENTION

The invention relates to surface catalyzed membranes.

BACKGROUND OF THE INVENTION

There are four classes of catalytic membrane reactors, based on their topological configurations. The first class, called a perma-selective wall membrane reactor, has a semi-permeable membrane to transport a product or reactant while confining a bulk or homogeneous catalyst behind the membrane. The second class, called a tea-bag reactor, has a catalyst sandwiched between two membranes. The third class, called a membrane confined catalytic reactor, has a catalyst in the interior of a membrane. Reactions are catalyzed and products are formed as reactants flow through the interior of the membrane. The fourth class, called a surface catalyzed membrane reactor, has a single catalytic layer which forms the non-porous membrane or which is attached to the surface of a non-porous membrane structure to induce reactions that form products at the exterior surface of the catalytic layer. It is this latter class with which the present invention is concerned.

Single layer surface catalyzed membranes have been primarily used for hydrogenation and dehydrogenation reactions. See, for example, Zelyaeva et al., *Khim. Tekhnol.*, 22(6), 684-7 (1979), which discloses the use of pure metal films (usually Pd foils) in hydrogenation and dehydrogenation reactions. An advantage of such a system derives from the spatial separation of the catalytically important functions of bond activation and activated species transport. Unfortunately, reaction rates for such membranes are quite low due to the limited permeability of the thick (20-1,000 micron) films employed to transport hydrogen. In this regard, see Zhernosek et al., *Kinet. Katal.*, 20(4), 921-4 (1979). Thus, it is an object of the present invention to provide a surface catalyzed membrane that has improved transport properties.

SUMMARY OF THE INVENTION

Accordingly, there is provided a catalytic membrane comprising a porous substrate having a first surface and a second surface. The substrate has micropores, for example, pores ranging from about 10 Å to about 2000 Å in diameter, at least in a region extending from the first surface toward the second surface for a preselected distance. Preferably, the preselected distance will be sufficient to provide a measurable resistance to the flow of a fluid, such as a gas, through the micropores. A catalyst is deposited at least on the first surface of the substrate, although optionally, the catalyst is deposited on the substrate in the micropore region. A transport layer is provided on the first surface of the substrate, including any catalyst on the first surface.

In one embodiment of the present invention, the substrate has a microporous region at its first surface and a porous region, i.e., a region having pores with diameters greater than about 2000 Å, at its second surface.

In yet another embodiment, the catalytic membrane comprises a microporous substrate having a first surface and a second surface. The pore sizes of the substrate are in the range of from about 10 Å to about 250 Å. The second surface of the substrate is supported by a porous having pore sizes in the range of from about 20 $\mu$m about 0.05 $\mu$m. Deposited on the microporous substrate is a catalyst capable of activating hydrogen. Covering the first surface of the substrate, including the deposited catalyst, is a transport layer consisting essentially of a transition metal compound which is capable of transporting dissociated hydrogen molecules.

These and other embodiments will be described in greater detail hereinafter.

DESCRIPTION OF THE PREFERRED EMBODIMENTS

A chief feature of the membrane of the present invention is that it is composed of a substrate that possesses physical micropores. A catalyst is in contact with the micropores and a transport layer is in close proximity to micropores of the substrate.

In general, the transport and microporous substrate should provide some diffusional resistance to the flow of reactants and products across the membrane. The diffusional resistance allows different reactants to be partially segregated on opposite sides of the membrane. Also, the transport layer must be capable of transporting at least one species formed by activation of at least one of the reactants on the catalyst. The activated species will diffuse from the catalyst layer to the membrane surface because of a concentration gradient. The concentration gradient exists because the activated species is consumed by reaction with another reactant which approaches from the opposite side. Reactions must occur near the surface of the transport layer, as well as at the catalyst surface. The predominant reaction near the transport layer surface must be different from the reaction at the catalyst surface. One way of meeting this requirement is to make the transport layer out of an almost continuous dense (non-microporous) film through which species activated by the catalyst diffuse. To gain functional advantages from the architecture described, at least one of the reactants or products must be fed to or removed from the side of the of the membrane opposite that of the rest of the molecular species involved in the reaction occurring near the transport layer surface.

Figure 1:
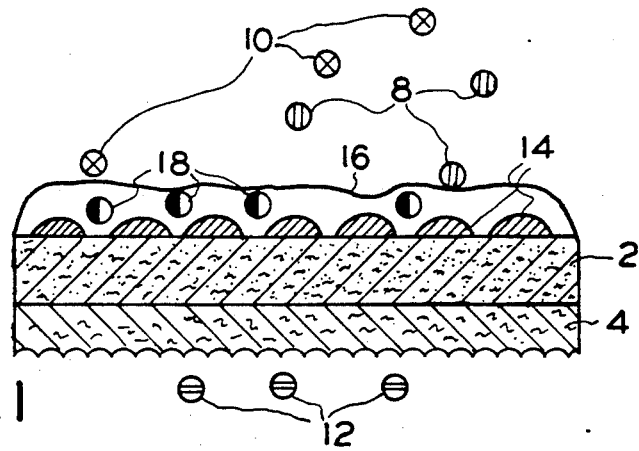
FIG. 1 is a schematic diagram of one multilayered catalyst membrane structure of the present invention.
Figure 2:
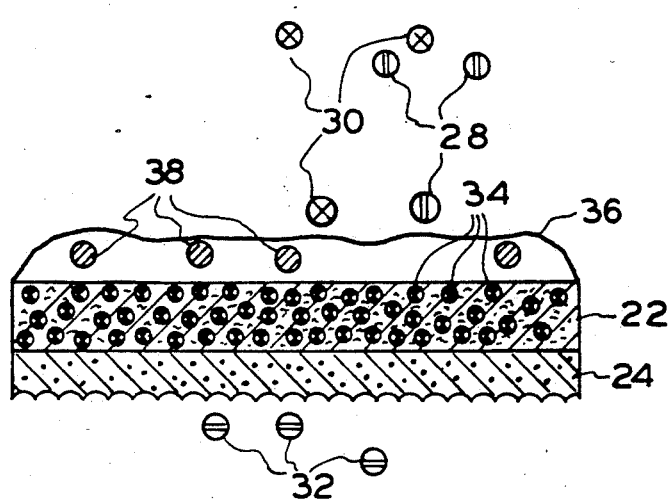
FIG. 2 is a schematic diagram of another multilayered catalyst membrane structure of the present invention.

Two different ways of meeting the aforementioned requirements for forming multilayered catalyst architectures on microporous membranes are shown schematically in FIGS. 1 and 2. In FIG. 1, the catalyst 14 is coated as an island film over the first surface of a microporous substrate 2. Small islands of catalyst ranging from about 10 Å to about 200 Å are preferred. The thin island film of catalyst 14 is overcoated with an almost continuous transport layer 16 which covers the catalyst 14 and seals off the microporous substrate 2 at the first surface of the membrane. Thickness of the transport layer should be less than 25 μm to maximize the reaction rate and it is preferable that it be less than 1 μm thick. Typically, the transport layer will range about 0.1 μm to about 5 μm in thickness. In the embodiment of FIG. 1, the microporous substrate 2 has micropores extending from its first surface to its second surface. Optionally, a porous support material 4 is in physical contact with the second surface of the substrate 2. The support, in general, will h in the range of from about 0.05 lm to about 20 μm. Thus, the architecture shown in FIG. 1 meets the requirements that: (1) the transport layer be in contact with some portion of the catalyst and (2) that the catalyst be in contact with micropores.

A different way of satisfying the foregoing requirements is shown in FIG. 2. In FIG. 2, the catalyst 34 is dispersed throughout a microporous layer 22, which is overcoated with a transport layer 36. To be incorporated into the pore structure of the microporous layer, the catalyst particles should have dimensions of less than 100 Å. The transport layer 36 contacts some of the dispersed catalyst 34 and seals the micropores. This architecture also meets the requirements for contact between transport layer, catalyst and micropores. As with the architecture shown in FIG. 1, microporous substrate 22 may optionally be supported by a porous support 24.

Figure 3:
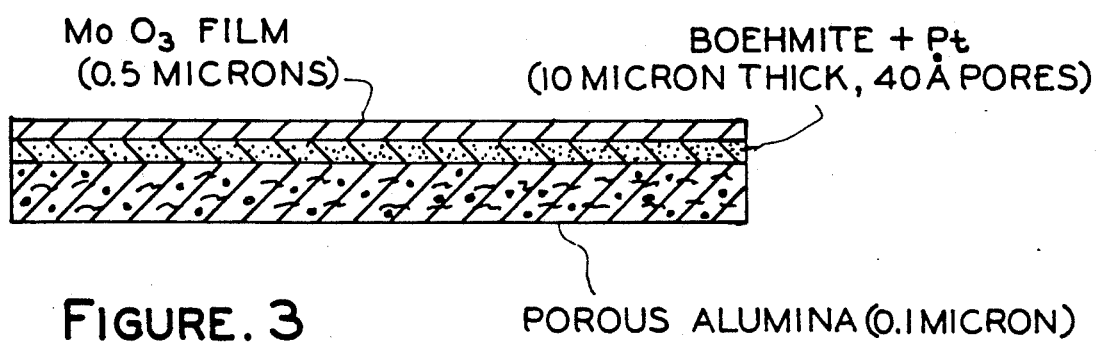
FIG. 3 is a schematic diagram of a particularly preferred multilayered catalyst membrane of this invention.

A particularly preferred structure for a surface catalyzed membrane is shown in FIG. 3. In that embodiment, the microporous substrate consists of gamma alumina, 10 microns thick, having pores 40 Å in diameter. The catalyst is platinum metal, deposited in the microporous substrate. The microporous substrate has a continuous transport layer of $MoO_3$ 0.5 microns thick on its first surface and the substrate is supported at its second surface by a porous alumina support.

In the embodiments described herein, the porous support typically will have pores ranging from about 0.05 μm to about 20 μm. The porous support can be made from porous metals formed by powder metallurgy, from a variety of porous ceramics and from porous polymers, such as polyamides. Ceramic processing techniques which can be used to produce the porous layers typically involve slip casting of ceramic powders. A preferred ceramic powder for slip casting is alpha alumina. Hence, porous alumina is a preferred support.

The microporous substrate can be made from a variety of materials, such as titania, zirconia, silica, ceria, alumina, and mixtures thereof. Microporous films of alumina can be prepared using sol gel chemistry. Temperature programmed curing of boehmite sol gel coatings results in gamma alumina layers with micropores. Size of the micropores can be adjusted from about 40 Å to about 500 Å by varying the composition of the sol, and the coating and curing conditions. Other methods for preparing microporous substrates include chemical vapor deposition and electrodeposition. In a preferred embodiment, the micropores near the first surface of the substrate have sizes less than 200 Å. It is desirable for the microporous substrate to be thick enough to offer some mass-flow resistance. Mass flow resistance through the microporous layer mitigates effects of pinholes, if any, in the transport layer. To provide some mass transport resistance, the microporous layer should be at least 0.01 μm thick and it is preferred that it be more than 0.1 μm thick. Indeed, it is most preferred that the microporous substrate be 0.25 to about 20 μm in thickness.

The catalyst deposited on or in the microporous substrate is one which is capable of activating at least one of a predetermined species in a given chemical reaction. For hydrogenation or dehydrogenation reactions, the catalyst is, preferably, a metal or metal compound capable of activating hydrogen. Examples of such metals include Pt, Ni and Pd. Examples of such compounds include $MoS_2$, $RuS_2$ and $ReS_2$. The catalyst must be either dispersed as small 10 Å to 100 Å particles throughout the microporous layer or can be coated as an island film over exterior surface of the microporous layer. Metallic catalytic island films with island sizes of about 5 Å to about 500 Å can be coated over exposed microporous surfaces by a variety of physical vapor deposition techniques, such as sputtering, evaporation and chemical vapor deposition. The catalyst can be deposited throughout the entire volume of the microporous substrate by impregnation techniques and the like.

A substantially non-microporous transport layer that allows diffusive transport of a catalytically activated species must effectively cover the catalyst and microporous substrate. The transport layer will be selected from materials capable of moving an activated species away from the surface where products are formed. For hydrogenation or dehydrogenation processes, the transport layer is selected from transition metal compounds that transport dissociated hydrogen molecules. Examples include $MoO_3$, $WO_3$, $V_2O_5$, $VOPO_4$, $TaS_2$, $MoS_2$ and $BaRuO_3$. This layer can be applied by conventional techniques such as dip coating and spin coating sols, sputtering and evaporation deposition techniques. To maximize the surface arrival rate of activated species, it is preferred that the thickness of the transport layer be less than 25 microns. In a more preferred embodiment, the thickness of the transport-layer is less than 1 micron. A most preferred range of thickness of the transport layer is from about 0.1 μm to about 5 μm.

To exemplify operation of the surface catalyzed membrane of this invention, reference is again made to FIGS. 1 and 2. In FIGS. 1 and 2, molecules 8 and 28 (e.g., cyclohexane) represent the dominant products. In FIG. 1, the product 8 is formed by reaction of molecules 10 (e.g., cyclohexene) and 12 (e.g., hydrogen). Reactant 12 diffuses through the porous support 4 and microporous substrate is activated by the catalyst 14 to form an activated species 18. The activated species 18 diffuses through the transport layer and forms the product 8 by reaction with reactant 10. The diffusional resistance of the microporous and transport layers (2 and 16, respectively) tends to segregate reactant 12 on the opposite side of the membrane from the product 8 and reactant 10. In FIG. 2, the product 28 is formed by reaction of molecules 30 and 32. Reactant 32 diffuses through the porous suppqrt 24 and the microporous substrate 22 and is activated by the catalyst 34 to form an activated species 38. The activated species 38 diffuses through the transport layer and forms the product 28 by reaction with reactant 30. The diffusional resistance of the microporous and transport layers (22 and 36, respectively) tends to segregate 30 on the opposite side of the membrane from the product 28 and reactant 32.

EXAMPLE 1

Figure 4:
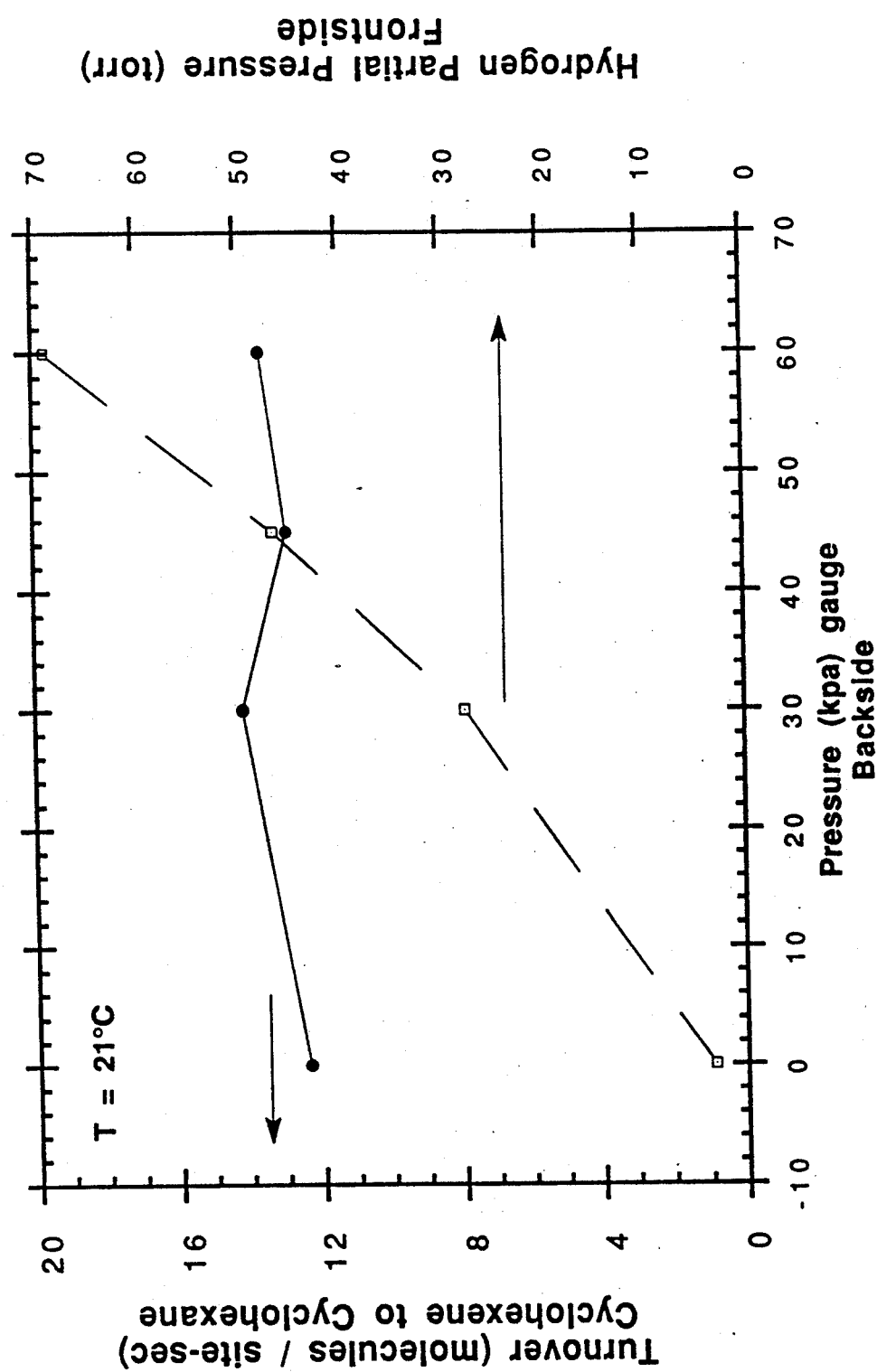
FIG. 4 is a graph showing the rate of hydrogenation of cyclohexene as a function of hydrogen pressure using the membrane of FIG. 3.
Figure 5:
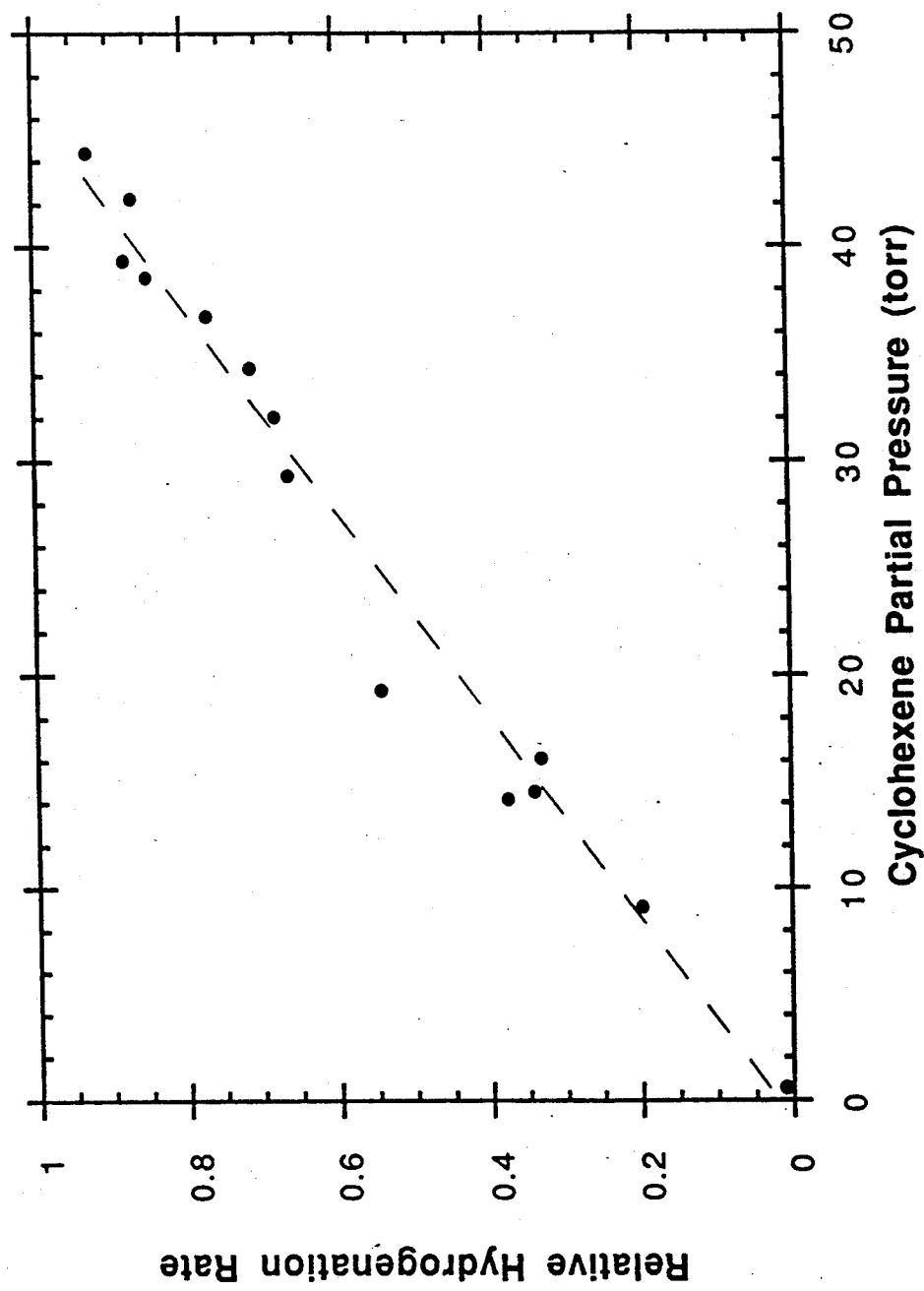
FIG. 5 is a graph showing that the rate of hydrogenation of cyclohexene as a function of olefin partial pressure using the membrane of FIG. 3.

A composite membrane structure was prepared as follows. An alumina ceramic support was prepared by casting a 1 inch diameter disk from an aqueous slip of 0.5 μm alumina particles containing a small amount of nitric acid. The slip was dried at room temperature and then calcined at 1200° C. for 2 hours. The disk was polished to a final thickness of 2 mm. The support was characterized by mercury porosimetry and found to have an average pore size of 900 Å and a porosity of 41%. The intermediate layer was prepared by dip coating in a 0.5M boehmite sol. The dipped support was dried and calcined at 400° C. for 24 hours. The complete procedure was repeated to form an intermediate layer 10 μm thick. Characterization of layers cast by the same procedure indicates that this method leads to a pore size of 35 Å and a porosity of 50–55%. Platinum was then introduced into the intermediate layer by impregnation of 0.5 ml of an aqueous solution of chloroplatinic acid ($H_2PtCl_6$) containing 0.762 g of platinum metal per liter. The membrane containing platinum was then dried at 90° C. for 16 hours and then calcined at 400° C. in air for 24 hours. The top layer was made by RF sputtering from a target of $MoO_3$ in argon containing 20% oxygen. The thickness of the $MoO_3$ layer was 6700 Å thick. The membrane was mounted in a metal holder separating two compartments. A double viton O ring seal was used to make gas tight seal between the two compartments. Hydrogen was supplied to the support side of the membrane structure (backside) and a stream of argon containing cyclohexene was flowed over the $MoO_3$ side of the membrane (frontside). The configuration is shown schematically in FIG. 1. The hydrogenation of cyclohexene to cyclohexane was used to monitor the activity of the catalytic membrane. In one experiment at 21° C. and at a partial pressure of cyclohexene of 76 torr, the rate of hydrogenation was measured as a function of the pressure of hydrogen applied to the backside of the membrane which increases the frontside partial pressure. The rate of reaction was found to be independent of the hydrogen partial pressure (see FIG. 4). In a second experiment, also at 21° C., the hydrogen partial pressure was fixed and the cyclohexene partial pressure was varied. The results are shown in FIG. 5 and indicate a linear dependence of the rate of reaction on the olefin partial pressure. This behavior is strikingly different from that observed on particulate hydrogenation catalysts in conventional reactor systems. ("The Foundations of Chemical Kinetics", S. W. Benson, 1982, Robert E. Krieger Publishing Company, Malabar, Fla., p. 638.)

What is claimed is:

1. A catalytic membrane comprising:
   a porous substrate having a first surface and a second surface, the substrate having micropores at least in a region extending from the first surface to the second surface
   a catalyst deposited on at least the first surface;
   a substantially continuous transport layer on the first surface of the substrate and the catalyst deposited thereon wherein the transport layer consists essentially of a transition metal compound capable of transporting catalytically active species.

2. The membrane of claim 1 wherein the micropores range in diameter of from about 10 Å to about 2000 Å.

3. A catalytic membrane comprising:
   a microporous gamma alumina substrate having a first surface and a second surface;
   a porous alumina support contacting the second surface of the substrate;
   a catalyst deposited on the first surface of the substrate;
   a thin, continuous transport layer deposited on the catalyst and the first surface of the substrate, the transport layer consisting essentially of a transition metal compound capable of transporting dissociated hydrogen molecules.

4. The membrane of claim 2 wherein the transition metal compound is selected from the group consisting of $MoO_3$, $WO_3$, $V_2O_5$, $VOPO_4$, $TaS_2$, $MoS_2$ and $BaRuO_3$.

5. The membrane of claim 2 wherein the transport layer is less than 1 micron thick.

6. The membrane of claim 5 wherein the microporous substrate is selected from the group consisting of titania, zirconia, silica, ceria, alumina and mixtures thereof.

7. The membrane of claim 6, including a porous support and wherein the second surface of the substrate is supported by the porous support.

8. The membrane of claim 7 wherein the porous support has pore sizes ranging from about 0.05 μm to about 20 μm.

9. The membrane of claim 3 wherein the catalyst is selected from the group consisting of Pt, Pd, Ni, $RuS_2$, $ReS_2$ and $MoS_2$.

10. The membrane of claim 9 wherein the transition metal compound is selected from the group consisting of $MoO_3$, $WO_3$, $V_2O_5$, $VOPO_4$, $TaS_2$, $MoS_2$ and $BaRuO_3$.

* * * * *